United States Patent [19]
Gerard et al.

[11] Patent Number: 5,689,330
[45] Date of Patent: Nov. 18, 1997

[54] LASER PLANE GENERATOR HAVING SELF-CALIBRATING LEVELLING SYSTEM

[75] Inventors: Philip O. Gerard, Lowell; David M. Falb, Grand Rapids; Bruce A. Boersma, Middleville, all of Mich.

[73] Assignee: Laser Alignment, Inc., Grand Rapids, Mich.

[21] Appl. No.: 415,344

[22] Filed: Apr. 3, 1995

[51] Int. Cl.$^6$ .................................................. G01B 11/26
[52] U.S. Cl. ........................ 356/138; 356/152.1; 33/291
[58] Field of Search ........................... 356/138, 152, 356/149, 150, 248, 249; 33/286, 290, 291, 293, 294, DIG. 21

[56] References Cited

U.S. PATENT DOCUMENTS

| | | |
|---|---|---|
| 3,400,596 | 9/1968 | Laich . |
| 3,876,309 | 4/1975 | Zicaro et al. . |
| 3,936,197 | 2/1976 | Aldrink et al. . |
| 4,062,634 | 12/1977 | Rando et al. .................... 356/248 |
| 4,221,483 | 9/1980 | Rando . |
| 4,519,705 | 5/1985 | Morrow ............................ 356/138 |
| 4,674,870 | 6/1987 | Cain et al. ........................ 356/152 |
| 4,679,937 | 7/1987 | Cain et al. ........................ 356/152 |
| 4,756,617 | 7/1988 | Cain et al. ........................ 356/152 |
| 4,767,208 | 8/1988 | Cain et al. ........................ 356/152 |
| 4,786,178 | 11/1988 | Teach . |
| 4,830,489 | 5/1989 | Cain et al. . |
| 4,852,265 | 8/1989 | Rando et al. . |
| 4,912,851 | 4/1990 | Rando et al. . |
| 5,000,564 | 3/1991 | Ake . |
| 5,485,266 | 1/1996 | Hirano et al. .................... 356/249 |

*Primary Examiner*—Samuel A. Turner
*Attorney, Agent, or Firm*—Van Dyke, Gardner, Linn & Burkhart, LLP

[57] ABSTRACT

A self-levelling laser generator apparatus (10) includes a housing (12), a light source in the housing which produces a beam of collimated light, and a self-levelling mechanism (18). The self-levelling mechanism includes an electronically controllable signal source, such as a digital potentiometer (46), which is provided a command (44a–44c) from a programmed computer (38) to produce a controllable output (48). The output of (48) the digital potentiometer is summed by a summing circuit (34) with the output (28) of an inclination sensor (24) in order to produce a compensated inclination signal (36) which is provided as an input to computer 38. The computer additionally receives a calibration input (20, 21) indicative of deviation between the inclination of the laser beam and a predetermined grade. The computer produces a drive signal (50a, 50b) for the self-levelling mechanism (52, 54) that is a function of the compensation inclination signal. The output (44a–44c) supplied by computer 38 to the digitally controllable signal source (46) is a function of the tilt of the inclinometer and calibration numbers entered through calibration inputs (20, 21).

28 Claims, 6 Drawing Sheets

LASER PLANE GENERATOR HAVING SELF-CALIBRATING LEVELLING SYSTEM

BACKGROUND OF THE INVENTION

This invention relates generally to laser plane generators used in the construction industry and especially those which are self-levelling. More particularly, the invention relates to a method and apparatus for calibration of the self-levelling mechanism of the laser plane generator.

Self-levelling laser plane generators have long been known. A laser plane generator includes a laser source for generating a beam of collimated light and a rotating mechanism for rotating the beam of light about an axis to generate a plane of light. Such device may additionally pass a portion of the beam of light along the axis of rotation of the beam in order to provide a reference beam that is perpendicular to the light plane.

Such laser apparatus finds use in surveying applications as well as in guiding various forms of automatically controlled construction equipment, such as road graders, dozers, excavators, and the like. In order to provide guidance, it is necessary to have a known orientation of the laser plane with respect to true earth reference. Typically, the laser plane is oriented perpendicular to the earth's gravitational field. Such levelling of the apparatus may be accomplished either manually or by a self-levelling mechanism. A self-levelling mechanism typically includes an inclination sensor aligned with each axis of the apparatus, which typically includes three perpendicular axes. The resistance of a conductive fluid in a vial in each inclinometer sensor is utilized to operate servo motors in order to drive the orientation of the beam until the inclinometer indicates a level orientation. Alternatively, the laser plane may be oriented at an angle with respect to the earth's horizontal by rotating the inclinometer according to the desired slope. This will cause the self-levelling mechanism to orient at least one axis of the apparatus according to the offset angle of its respective inclinometer.

Self-levelling laser plane generators require factory calibration, and occasional field calibration after the unit has left the factory, of the self-levelling mechanism so that the angle of the laser plane matches that entered by the operator. Such calibration typically includes providing a mechanical adjustment device, such as a screw shaft or a mechanical potentiometer, which is accessible only with the housing of the apparatus removed or through an external access opening, in order to provide adjustment of the position of each inclinometer on the apparatus chassis or to electrically adjust the output signal produced by the inclinometer. The adjustment device may be adjusted until the laser plane produced by the apparatus is perpendicular to the earth's gravitational field. One difficulty with such calibration arrangement is that it requires disassembly of the unit in order to perform the calibration. Such removal of the housing exposes the internal mechanisms of the apparatus to contamination. In order to overcome this difficulty, it is known to provide an external mechanism, such as a knob or lever, in order to allow the self-levelling mechanism to be calibrated without requiring removal of the housing. While such mechanism avoids some of the difficulty with contamination of the internal mechanism of the apparatus by removing the cover, it invites tampering with the lever or knob by untrained operators or technicians, which may invalidate the calibration of the self-levelling mechanism. Furthermore, penetration of the housing by calibration knobs and openings provides an entry point for debris.

SUMMARY OF THE INVENTION

The present invention provides a method and apparatus for electronically calibrating the levelling system of a laser plane generator in a manner which is easy to perform by factory and field operators and which is reliable and tamper resistant.

A self-levelling laser generator and calibration method according to another aspect of the invention includes a light source for producing a beam of collimated light and an inclination sensor mounted to rotate with the light source about an axis of the laser generator. The inclination sensor produces an output that is an indication of the magnitude of inclination of the housing about the axis. A levelling mechanism is provided which is responsive to a drive signal in order to adjust the inclination of the beam about the axis. A computer-based control is provided. An input is provided to the control for entering data indicative of a deviation between the inclination of the beam and a predetermined grade. The control produces a drive signal for the levelling mechanism that is a function of the value of the inclination sensor output and any deviation entered through the input. In this manner, the levelling mechanism will change the orientation of the beam to align the beam with the predetermined grade. According to another aspect of the invention, an electronically controllable signal source is provided which responds to a command by producing a signal having a particular value. The signal produced by the signal source is combined with the output of the inclination sensor in order to produce a drive signal which is provided to the levelling mechanism to alter the orientation of the laser generator about the axis. A command is provided to the signal source by a programmed computer to produce a signal which, when combined with the output of the inclination sensor, produces a drive signal to orient the generator on a predetermined grade. The temperature of the inclination sensor is preferably sensed and used to compensate the combined output signal. The command signal is preferably established as a function of calibration counts determined during a calibration of the laser generator.

According to yet another aspect of the invention, a calibration range is provided having at least a plurality of first active targets and a plurality of second targets. Each of the first and second targets is arranged radially around the generator with the second targets being further than the first targets from the generator. A calibration computer processes the outputs of the active targets into a digital data signal which is an indication of the inclination of the beam about the axis. The inclination is determined from an output of each active target indicating which portion of that target is contacted by the beam. The digital data signal is provided to the laser generator input for use by the laser generator control in correcting the orientation of the beam.

These and other objects, advantages, and features of this invention will become apparent upon review of the following specification in conjunction with the drawings.

DESCRIPTION OF THE PREFERRED EMBODIMENT

Figure 1:
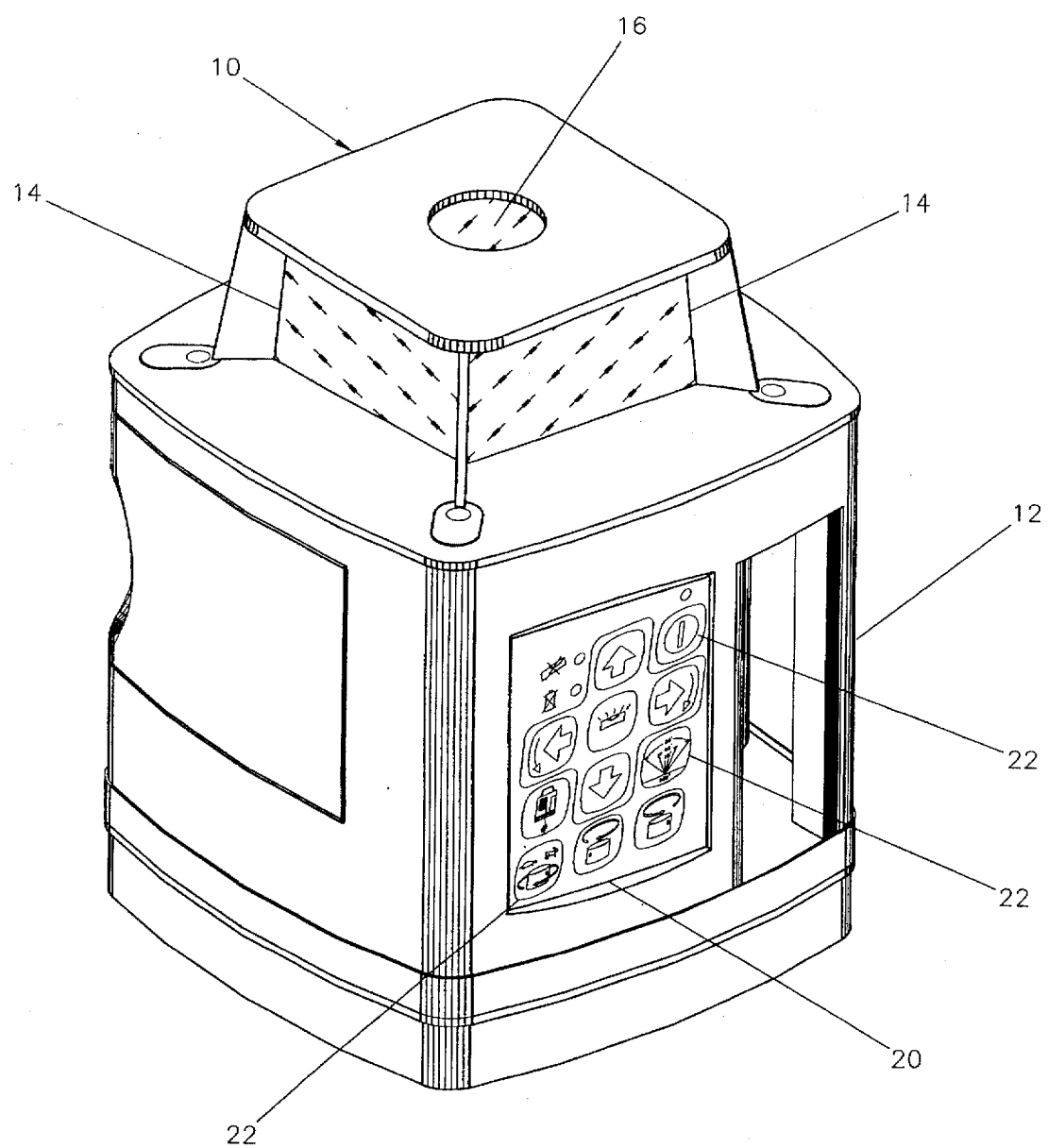
FIG. 1 is a perspective view of a laser plane generator incorporating the invention.

Referring now specifically to the drawings and the illustrative embodiments depicted therein, a self-levelling laser plane generator 10 includes a housing 12 and a plurality of transparent windows 14 in the housing for conducting a rotating laser beam from a rotating head (not shown) while keeping debris and the like from the interior of the housing. A window 16 is provided on an upper surface of the housing in order to transmit a beam of collimated light perpendicular to the laser plane transmitted through windows 14. An additional window (not shown) may be provided on the bottom of the housing to transmit an additional perpendicular beam. Such laser plane generator is well known in the art and is disclosed in U.S. Pat. No. 3,936,197, which is assigned to Applicants' assignee for a SELF-LEVELLING LASER ASSEMBLY, the disclosure of which is hereby incorporated herein by reference. Laser plane generator 10 additionally includes a user input device 20, which, in the illustrative embodiment, is a keypad made up of a plurality of individual key switches 22. Keypad 22 preferably is a mylar switch panel in order to sealingly engage the surrounding portions of housing 12 and thereby keep debris and moisture from the interior housing 12. Other input devices, such as capacitive touch panels, individual switches, voice recognition systems, RF and infrared remote control, and the like may be utilized.

Figure 2:
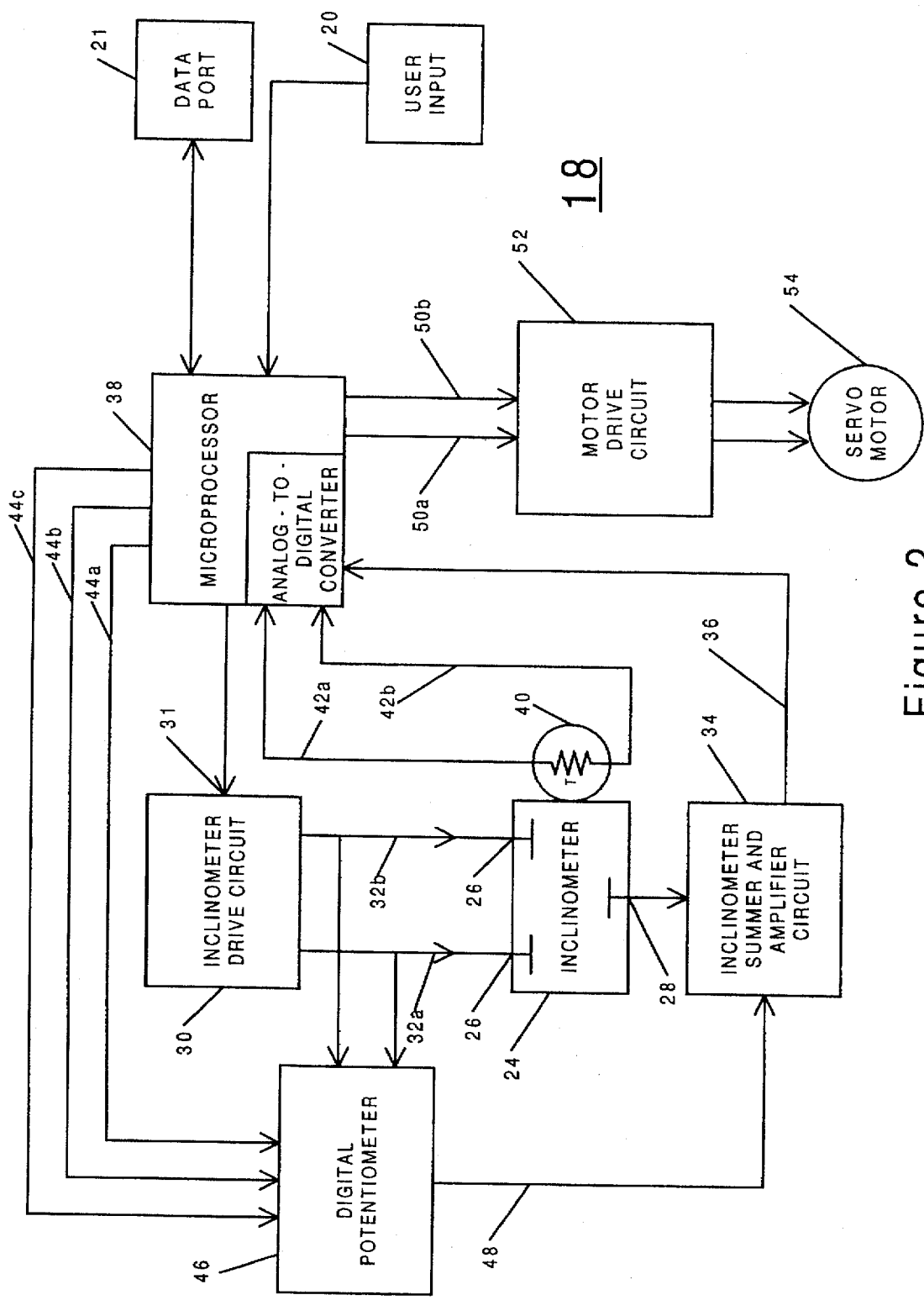
FIG. 2 is a block diagram of a self-calibrating levelling system according to the invention.

Laser plane generator 10 includes a self-levelling mechanism 18, which is capable of aligning each of the three mutually orthogonal axes of apparatus 10 with true earth horizontal (FIG. 2). Self-levelling mechanism 18 includes an inclinometer, or inclination sensor, 24 aligned with each major axis of the laser plane generator, although only one is illustrated in FIG. 2. Inclinometer 24 includes first and second spaced apart input electrodes 26 and an output electrode 28. An inclinometer drive circuit 30 applies a square wave signal across leads 32a, 32b connected with electrodes 26. An output signal taken from output electrode 28, which is a function of the direction and degree of tilt of inclinometer 24, is provided as an input to an inclination summer and amplifier circuit 34. An output 36 of summer and amplifier circuit 34 is provided as an input to a microprocessor 38. A temperature sensitive thermistor 40, which is in temperature sensing proximity with the environment of inclinometer 24, provides inputs at 42a, 42b to microprocessor 38.

Microprocessor 38 includes outputs 44a, 44b, and 44c which supply a digital command to an electronically controlled signal source such as a digital potentiometer 46. An output 48 of digital potentiometer 46 is provided as an input to inclination summer and amplifier circuit 34. Microprocessor 38 additionally includes output lines 50a, 50b, which are provided as inputs to a motor drive circuit 52. Motor drive circuit 52 controls movement of a servo motor 54, which adjusts the position of the beam in one axis. The self-levelling mechanism 18, illustrated in FIG. 2, provides self-levelling capabilities for apparatus 10 in one of three mutually perpendicular axes. For each additional axes to be self-levelled, the hardware illustrated in FIG. 2 would be replicated although it is possible that particular components may be time-shared or may otherwise be capable of handling more than one axis. Signal source 46 could be accomplished by other programmable circuits such as an amplifier having a programmable gain. Furthermore, signal source 46 could be combined with summer and amplifier circuit 34 in a combined circuit. Indeed, the techniques of the present invention could be carried out entirely in software with only calibration data, inclination sensor output and temperature data being provided as inputs to a programmed computer.

Input device 20 is connected with microprocessor 38 through conventional multiplexing techniques in order to provide user input selections of commands utilized in the calibration of apparatus 10 as will be set forth in more detail below. A data port 21, which is accessible through housing 12, receives digital data and provides such data as an input to microprocessor 38.

The operation of self-levelling mechanism 18 is as follows. Inclination drive circuit 30 applies a square wave to input electrodes 26 of inclinometer 24 in response to a command from microcomputer 38 provided on an input 31. Inclination summer and amplifier circuit 34 sums the output of inclinometer 24 measured at electrode 28 with an offset value provided by output 48 of digital potentiometer 46. The summation of these two signals is amplified and provided on output 36 as an input to microprocessor 38. The level of the offset produced on output 48 of digital potentiometer 46 is selected by a digital command produced by microprocessor 38 on its outputs 44a–44c. The output produced by microprocessor 38 is a function of the temperature of the inclinometer as monitored by thermistor 40, the tilt of the inclinometer, and calibration numbers entered by the user to input keys 20, as will be described in more detail below. The amount the inclinometer will drift is a function of its tilt and temperature. Self-levelling mechanism 18 compensates for this drift by measuring the tilt and temperature of inclinometer 24 and then calculating a new inclinometer output voltage on line 36 that is considered null. Once the tilt and temperature of inclinometer 24 are known, this information is fit to a drift/tilt verses temperature curve in microprocessor 38. The value obtained from this evaluation is multiplied by the tilt of the inclinometer to determine drift.

An example of such drift compensation is as follows. Assuming that the temperature measured by thermistor 40 is 0° C. and inclinometer is tilted 100 arcseconds, the temperature is fit to the drift versus temperature curve in the microprocessor. A reading of −0.189 arcseconds drift/tilt is multiplied by 100 arcseconds of tilt to arrive at a factor of −18.9 arcseconds of drift. Output 36 of amplifier circuit 34 is 20 millivolts per arcsecond. The new levelling position will, therefore, be (−18.9 arcseconds)·(20 millivolts/arcsecond)=−378 millivolts. The drift/tilt verses temperature curve is measured for each inclinometer 24 during manufacture of laser plane generator 10 in order to characterize that particular inclinometer in microcomputer 38.

Calibration of self-levelling mechanism 18 is accomplished by measuring a calibration error of laser plane generator 10 and adding or subtracting calibration counts via input device 20 or data port 21. The calibration count changes the setting of each digital potentiometer and, thereby, inclinometer 24, with each calibration count changing the calibration by a predetermined value. In the illustrated embodiment, each calibration count is equal to 4 arcseconds. Once self-levelling mechanism 18 is calibrated, the number of calibration counts is utilized by microprocessor 38 to determine the tilt of each inclinometer 24. Thus, for example, if the calibration is set to 25 calibration counts, the tilt of inclinometer 24 is 100 arcseconds.

Figure 3:
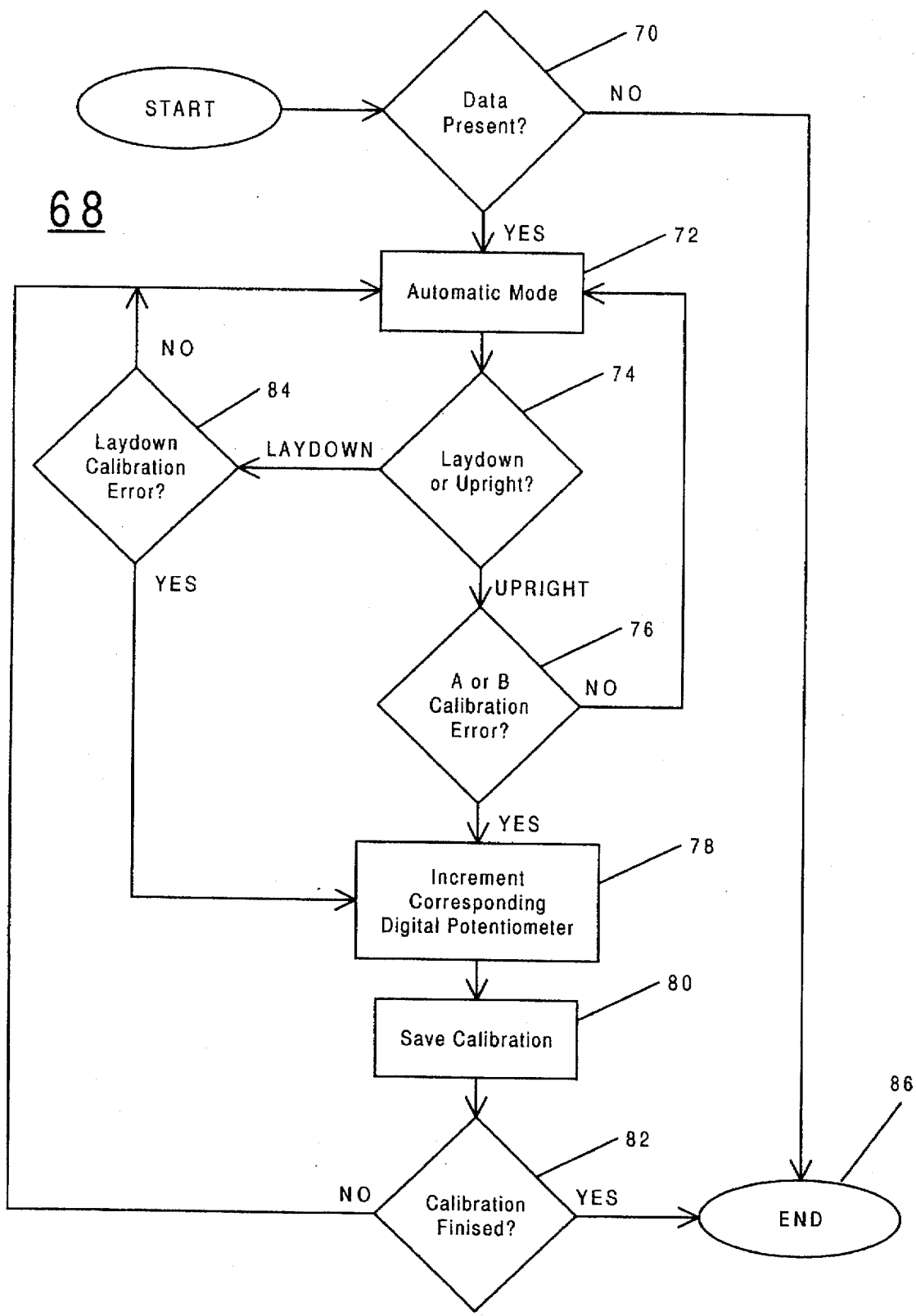
FIG. 3 is a flowchart of a factory calibration function.
Figure 6:
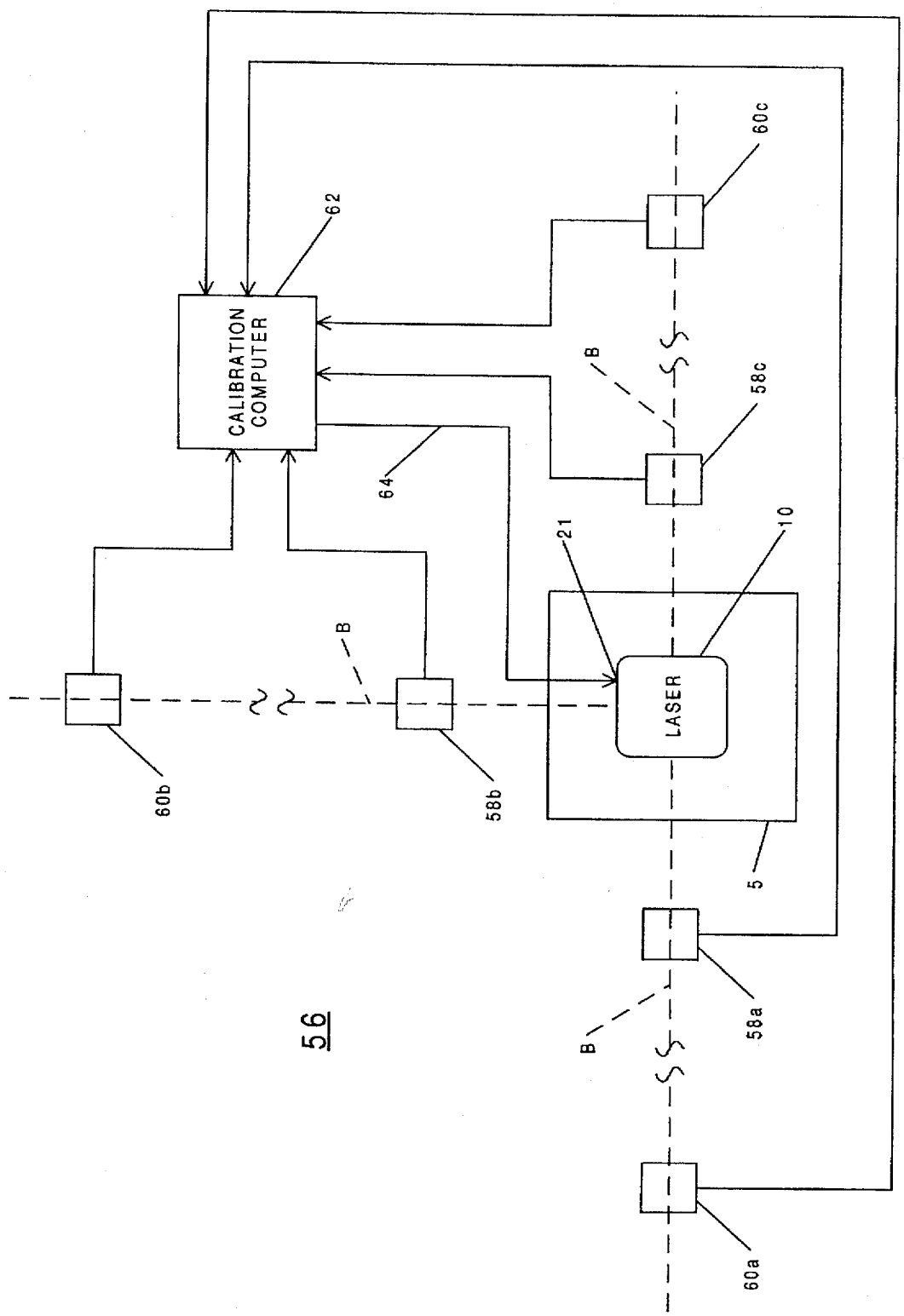
FIG. 6 is a block diagram of a test range according to the invention.

Laser plane generator 10 may be calibrated after manufacture in the factory, or when returned to the factory or repair facility for repair and/or service, utilizing an interactive calibration range 56 (FIGS. 3 and 6). Calibration range 56 includes a first pair of active targets 58a and 60a; a second pair of active targets 58b and 60b oriented perpendicular to the first pair; and a third pair of active targets 58c and 60c oriented perpendicular to the second pair. All active targets 58a–58c and 60a–60c provide inputs to a calibration computer 62. Calibration computer 62 has an output 64, which provides digital data to data port 21 of self-levelling mechanism 18. The effective separation between each of the targets 58a–58c and the associated targets 60a–60c is preferably on the order of approximately 100–180 feet.

Calibration range 56 operates as follows. Laser plane generator 10 is set upon a surface S, which does not have to be perfectly level, and an input command is provided from calibration computer 62 through data port 21 to rotate beam B from a first position which passes through targets 58a and 60a, then through targets 58b and 60b and then through targets 58c and 60c. The portion of each target struck by the beam is provided as input to calibration computers 62, which stores the results therein. The scanning of the beam may be incremental or continuous rotation. The calibration computer calculates from the six (6) readings from the six (6) targets whether the generated surface is a plane and, if so, any error in the inclination of the plane. If the surface generated by beam B is not a plane, then the optics are adjusted. If the plane is inclined from earth's horizontal, or other predetermined grade, the amount of error is provided to data port 21.

Self-levelling mechanism 10 performs a factory calibration routine 68 (FIG. 3). The routine is initiated upon microprocessor 68 sensing (70) the presence of data at data port 21. The presence of data on data port 21 is interpreted by microprocessor 68 as a command to place the self-levelling mechanism in an automatic mode (72) which causes microprocessor 38 to rotate the beam head. It is then determined at 74 whether the laser plane generator is in an upright position, as illustrated in FIG. 6, or is in a lay down position, which is utilized to calibrate the self-levelling mechanism with respect to the beam transmitted through window 16, by monitoring a tilt-switch (not shown). If it is determined at 74 that the control is in an upright position, it is then determined (76) whether the data received from calibration computer 62 indicates the presence of a calibration error. If so, microprocessor 68 increments (78) the command provided on output lines 44a–44c to digital potentiometer 46 and the calibration count is saved (80) in microcomputer 38. It is then determined at 82 whether the calibration is complete. If calibration is not finished, then control passes to control function 72 where additional calibration data is processed by repeating the procedure.

If it is determined at 74 that the laser plane generator is in a lay down position, then it is determined at 84 whether a calibration error is being entered by calibration computer 62. If so, then digital potentiometer 46 is incremented (78) and the calibration count is saved (80) in microprocessor 38. If it is determined at 76 in the upright mode, or at 84 in the lay down mode, that no calibration error is being entered by calibration computer 62, then the control returns to control function 72. If it is determined at 70 that no data is being entered in data port 21 by calibration computer 62, then the factory calibration routine 68 is exited at 86.

Figure 4:
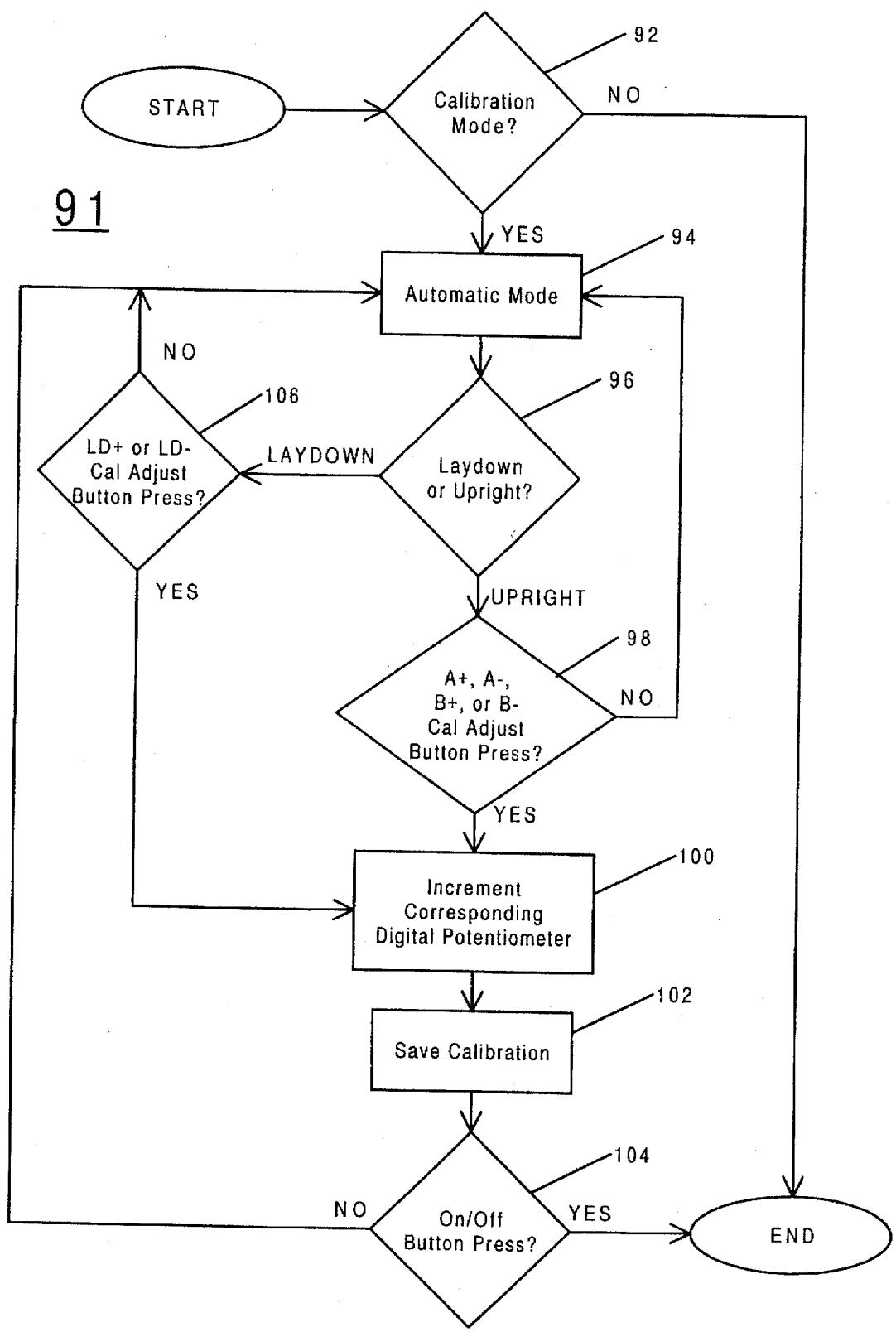
FIG. 4 is a flowchart of a field calibration function.
Figure 5:
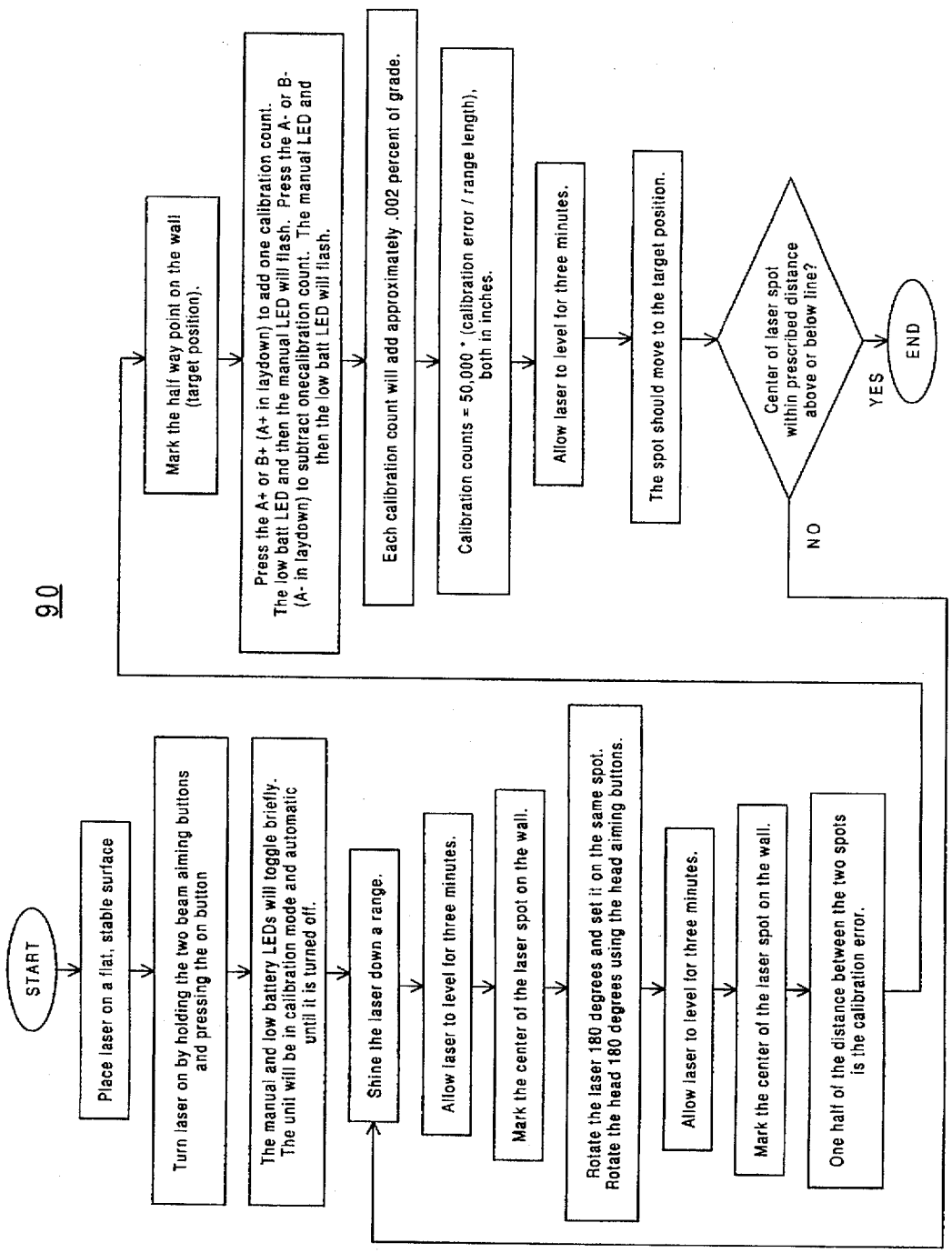
FIG. 5 is a process flow diagram of a field calibration procedure.

Laser plane generator 10 may be calibrated without calibration range 56 utilizing a field calibration procedure 90 (FIG. 5) and routine 91 (FIG. 4). The field calibration mode is established (92) by the user actuating one or more key switches 22 in a particular manner, which results in a particular mode of operation of one or more indicators. The key switches that are utilized are normally used for another purpose and, preferably, more than one must be actuated in order to enter the field calibration mode. This inhibits the incidental invoking of the calibration mode, which could result in a miscalibration of the apparatus. Once the automatic mode is entered (94), it is determined at 96 whether the apparatus 10 is being calibrated in a lay down or upright position by monitoring a tilt-switch (not shown). The laser plane generator is set on a surface and is allowed to self-level. The position of the stationary beam is marked on a distant wall; for example, one separated from the generator by approximately 100–180 feet. The housing of the unit is then rotated 180° and the beam repositioned at the same area of the wall. The new location of the spot is marked and one-half the distance between the two spots in the vertical direction is measured in order to arrive at a calibration error. If the instrument is in the upright position (96), a particular sequence of key switches, designated A and B, are actuated in order to enter the calibration count, if a calibration error is present (98). This causes microprocessor 38 to increment digital potentiometer 46 (100) and the entered calibration count is stored (102) in microprocessor 38. The procedure is repeated until an "off" switch is actuated at 104. If it is determined at 96 that the laser plane generator is being calibrated in a lay down position, then a different set of buttons, designated L and D, are actuated in order to enter the calibration count (106) if a calibration error is present. The digital potentiometer is incremented (100) and the calibration count stored (102) in microprocessor 38.

When calibrating in the lay down position, a different procedure is followed. In order to measure the amount of calibration error, the laser plane generator is transported to the position of the target and the beam directed back towards its original position. Two targets are utilized in the lay down mode calibration. The position of the beam on both targets, which are spaced about approximately the calibration distance of, for example, 100–180 feet, are measured in both positions of the instrument and used to determine the calibration error as would be apparent to one of ordinary skill in the art.

In the illustrated embodiment, microprocessor 38 is an 8-bit microcomputer Model No. M68HC705B5 which is marketed by Motorola. Digital potentiometer 46 is a commercially available circuit, which is marketed by Dallas Semiconductor under Model No. DS 1267 SN-10. Inclinometer 24 is a commercially available inclination sensor which is marketed by Spectron Specialty Glass under Model No. SH50055-A-009. Targets 58a–58c and 60a–60c utilized with calibration range 56 may be of the same general type disclosed in U.S. Pat. No. 5,243,398, which is commonly assigned with the present application, the disclosure of which is hereby incorporated herein by reference.

Thus, it is seen that the present invention provides a unique self-levelling mechanism for a laser plane generator which may be calibrated without requiring removal of the housing of the apparatus or providing of an access opening for mechanical adjustment. Furthermore, special calibration knobs and shafts, which may invite tampering by the user, resulting in miscalibration of the apparatus, are avoided. The present invention provides a method of calibrating a self-levelling mechanism in a laser plane generator, which is easy to explain in manuals and easy to implement by the field technician. Furthermore, a factory calibration range is provided which makes calibration of the self-levelling mechanism almost fully automated. The principles of the present invention may be applied to both a laser plane generator that is self-levelling to a horizontal inclination and to a laser plane generator that is self-levelling to a grade.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A self-levelling laser generator apparatus having a housing and a light source in said housing which produces a beam of collimated light, comprising:

an inclination sensor, mounted to incline with said light source about an axis, said inclination sensor producing an output signal that is an indication of the magnitude of inclination of said beam about said axis;

a levelling mechanism that is responsive to a drive signal in order to adjust the inclination of said beam about said axis;

a control having a computer and a digitally controllable signal source which responds to a command from said computer to produce an offset signal that is a function of the received command, said control further including a summing circuit which combines said offset signal with said output signal of said inclination sensor in order to produce a compensated inclination signal which is provided as a compensated inclination input to said computer; and a calibration input to said control for entering data indicative of a deviation between the inclination of said beam and a predetermined grade, said control being responsive to said compensated inclination input and to said calibration input in order to produce said command as a function of the value of any deviation entered through said calibration input and in order to produce said drive signal as a function of the compensated inclination signal to change the orientation of said beam to align said beam with said predetermined grade.

2. The self-levelling laser generator apparatus in claim 1 wherein said input receives said data externally of said housing in a manner which permits said housing to be sealed when receiving said data.

3. The self-levelling laser generator apparatus in claim 1 wherein said input is a user operable keypad which is mounted to be accessible externally of said housing.

4. The self-levelling laser generator apparatus in claim 1 wherein said input is a user operable remote control device which is coupled with said control by one of a radio frequency link and an infrared link.

5. The self-levelling laser generator apparatus in claim 1 wherein said digitally controllable signal source is a digital potentiometer.

6. The self-levelling laser generator apparatus in claim 1 wherein said digitally controllable signal source is an amplifier having a digitally controllable gain.

7. A self-levelling laser generator apparatus having a housing and a light source in said housing which produces a beam of collimated light, comprising:

an inclination sensor, mounted to incline with said light source about an axis, said inclination sensor producing an output signal that is an indication of the magnitude of inclination of said beam about said axis;

a levelling mechanism that is responsive to a drive signal in order to adjust the inclination of said beam about said axis;

a control having a computer; and an input to said control for entering data indicative of a deviation between the inclination of said beam and a predetermined grade, said control being responsive to said inclination sensor and to said input in order to produce a drive signal as a function of the value of said output signal and any deviation entered through said input in order to change the orientation of said beam to align said beam with said predetermined grade, wherein said input is a digital data port which receives digital data from a calibration range.

8. The self-levelling laser generator apparatus in claim 7 wherein said calibration range includes a plurality of first active targets and a plurality of second active targets, pairs of first and second active targets being arranged radially with respect to the laser generator in locations that intercept said beam with said second targets being farther from said laser generator than said first targets, and a calibration computer which produces an indication of inclination of said beam about said axis as a function of which portion of each of said plurality of first and second targets is contacted by said beam.

9. The self-levelling laser generator apparatus in claim 8 wherein said calibration range further produces a command to said laser generator to rotate the beam to define a surface.

10. The self-levelling laser generator apparatus in claim 8 wherein said calibration range further produces an indication if said surface is not planar.

11. A self-levelling laser generator apparatus having a housing and a light source in said housing which produces a beam of collimated light, comprising:

an inclination sensor, mounted to incline with said light source about an axis, said inclination sensor producing an output signal that is an indication of the magnitude of inclination of said beam about said axis;

a levelling mechanism that is responsive to a drive signal in order to adjust the inclination of said beam about said axis;

a control having a computer;

an input to said control for entering data indicative of a deviation between the inclination of said beam and a predetermined grade, said control being responsive to said inclination sensor and to said input in order to produce a drive signal as a function of the value of said output signal and any deviation entered through said input in order to change the orientation of said beam to align said beam with said predetermined grade; and a temperature sensor which is responsive to the temperature in the vicinity of said inclination sensor, wherein control is responsive to said temperature sensor in order to produce said drive signal also as a function of the temperature of said inclination sensor.

12. A method of calibrating a laser generator having an inclination sensor for sensing the inclination of said generator about one axis and a levelling mechanism which is responsive to a drive signal in order to modify the orientation of said generator, including:

providing an electronically controllable signal source which responds to a command by producing an offset signal having a particular value;

combining said offset signal produced by said signal source with an output of the inclination sensor in order to produce a drive signal which is provided to the leveling mechanism to alter the orientation of said generator about said axis;

manually entering calibration counts by a user utilizing a combination of keys of an input device which keys are normally used for a different purpose in response to a measurement of a beam produced by said laser generator; and providing a command to said signal source which causes said signal source to produce an offset signal which, when combined with said output of said inclinometer, produces a drive signal to orient the generator on a predetermined grade, wherein said command is a function of said calibration counts.

13. The method of claim 12 further including monitoring the temperature of said inclination sensor and compensating said drive signal as a function of the temperature of said inclination sensor.

14. The method of claim 12 wherein said electronically controllable signal source is a digital potentiometer.

15. The method of claim 12 wherein said electronically controllable signal source is an amplifier having a digitally controllable gain.

16. A self-levelling laser generator apparatus having a housing and a light source in said housing which produces a beam of collimated light, comprising:

an inclination sensor mounted to rotate with said light source about an axis, said inclination sensor producing an output signal that is an indication of the direction and magnitude of inclination of the beam produced by the light source about said axis;

a levelling mechanism responsive to a drive signal in order to adjust the inclination of said beam about said axis;

a digitally controllable signal source;

a summing circuit for combining the output of said signal source with the output of said inclination sensor in order to produce a compensated indication of inclination of said inclination sensor;

a programmable computer which is responsive to said compensated indication of inclination and is programmed to produce a drive signal for said levelling mechanism and command signals for said digitally controlled signal source; and a calibration input comprising one of a data port and a user input device for said programmable computer in order to supply calibration numbers to said programmable computer, wherein said programmable computer produces said command signals as a function of input values entered on said calibration input and wherein said programmable computer produces said drive signal as a function of said compensated indication of inclination and said input values entered on said calibration input.

17. The self-levelling laser generator apparatus in claim 16 wherein said input receives said data externally of said housing in a manner which permits said housing to be sealed when receiving said data.

18. The self-levelling laser generator apparatus in claim 16 wherein said digitally controllable signal source is a digital potentiometer.

19. The laser generator apparatus of claim 16 wherein said digitally controllable signal source is an amplifier having a digitally controllable gain.

20. A self-levelling laser generator apparatus having a housing and a light source in said housing which produces a beam of collimated light, comprising:

an inclination sensor mounted to rotate with said light source about an axis, said inclination sensor producing an output signal that is an indication of the direction and magnitude of inclination of the beam produced by the light source about said axis;

a levelling mechanism responsive to a drive signal in order to adjust the inclination of said beam about said axis;

a digitally controllable signal source;

a summing circuit for combining the output of said signal source with the output of said inclination sensor in order to produce a compensated indication of inclination of said inclination sensor;

a programmable computer which is responsive to said compensated indication of inclination and is programmed to produce a drive signal for said levelling mechanism and command signals for said digitally controlled signal source;

an input for said programmable computer in order to supply calibration numbers to said programmable computer, wherein said programmable computer produces said commands as a function of input values entered on said input and produces said drive signal as a function of said compensated indication of inclination; and a temperature sensor positioned to measure the temperature in the vicinity of said inclination sensor, said temperature sensor providing another input to said programmable computer which is a function of the temperature of said inclinometer and wherein said programmable computer produces said drive signal as a function of said temperature of said inclination sensor.

21. The self-levelling laser generator apparatus in claim 20 wherein said input is a user input keypad which is mounted to be accessible externally of said housing.

22. The self-levelling laser generator apparatus in claim 20 wherein said input is a digital data port which is accessible through said housing.

23. The self-levelling laser generator apparatus in claim 20 wherein said input is a user operable remote control device which is coupled with said control by one of a radio frequency link and an infrared link.

24. A method of calibrating the self-levelling capability of a self-levelling laser generator having a housing, a light source in said housing which produces a beam of collimated light which rotates in a plane, an inclination sensor for sensing the inclination of said light source about one axis and a levelling mechanism which is responsive to a drive signal in order to modify the orientation of said light source, including:

providing a calibration range having at least one pair of first and second electronic beam sensing devices spaced apart from each other away from the laser generator and each having an output that is a function of the portion of that sensing device contacted by the beam;

monitoring a beam produced by said laser generator apparatus utilizing said at least one pair of electronic beam sensing devices;

processing the outputs of said at least one pair of electronic beam sensing devices into a digital data signal and providing said digital data signal to the laser generator; and combining an output of the inclination sensor with said digital signal in order to produce a drive signal for adjusting said levelling mechanism to align said beam with a predetermined grade.

25. The method of claim 24 further including monitoring the temperature of said inclinometer and adjusting said producing said drive signal also as a function of the temperature of said inclinometer.

26. The method of claim 24 further including providing a command signal to said laser generator apparatus to rotate said beam in said plane.

27. The method of claim 24 wherein said calibration range has a plurality of pairs of said first and second electronic beam sensing devices arranged radially about the laser generator, wherein said monitoring includes monitoring said beam utilizing said plurality of pairs of devices and wherein said processing includes processing the outputs of said plurality of pairs of devices into a digital data signal.

28. The method of claim 27 further including providing a command signal to said laser generator apparatus to rotate said beam in said plane.

* * * * *